US011593637B2

(12) United States Patent
Luo et al.

(10) Patent No.: US 11,593,637 B2
(45) Date of Patent: Feb. 28, 2023

(54) CONVOLUTION STREAMING ENGINE FOR DEEP NEURAL NETWORKS

(71) Applicant: Samsung Electronics Co., Ltd., Suwon-si (KR)

(72) Inventors: Chenchi Luo, Plano, TX (US); Yuming Zhu, Plano, TX (US); Hyejung Kim, Murphy, TX (US); John Seokjun Lee, Allen, TX (US); Manish Goel, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 974 days.

(21) Appl. No.: 16/399,928

(22) Filed: Apr. 30, 2019

(65) Prior Publication Data
US 2020/0349426 A1 Nov. 5, 2020

(51) Int. Cl.
*G06N 3/08* (2006.01)
*G06N 20/10* (2019.01)
*G06N 7/04* (2006.01)

(52) U.S. Cl.
CPC .............. *G06N 3/08* (2013.01); *G06N 7/046* (2013.01); *G06N 20/10* (2019.01)

(58) Field of Classification Search
CPC ........... G06N 3/08; G06N 20/10; G06N 7/046
USPC ......................................................... 706/15
See application file for complete search history.

(56) References Cited

U.S. PATENT DOCUMENTS

| 10,157,333 | B1 | 12/2018 | Wang et al. |
| 2016/0239706 | A1 | 8/2016 | Dijkman et al. |
| 2017/0193361 | A1 | 7/2017 | Chilimbi et al. |
| 2017/0316312 | A1 | 11/2017 | Goyal et al. |
| 2017/0372202 | A1* | 12/2017 | Ginsburg ............. G06N 3/0454 |
| 2018/0300624 | A1 | 10/2018 | El-Khamy et al. |
| 2018/0300628 | A1 | 10/2018 | Young et al. |
| 2019/0122394 | A1 | 4/2019 | Shen et al. |

FOREIGN PATENT DOCUMENTS

KR 10-2019-0035445 A 4/2019

OTHER PUBLICATIONS

Tan, et. al., "A survey of power and energy efficient techniques for high performance numerical linear algebra operations", Parallel Computing 40 (2014) 559-573 (Year: 2014).*
"Fast Matrix Multiplication and Neural Networks", https://stackoverflow.com/questions/46984581/fast-matrix-multiplication-and-neural-networks, Oct. 2017, 3 pages.
(Continued)

*Primary Examiner* — Tsu-Chang Lee

(57) ABSTRACT

A method, an electronic device, and computer readable medium are provided. The method includes receiving an input into a neural network that includes a kernel. The method also includes generating, during a convolution operation of the neural network, multiple panel matrices based on different portions of the input. The method additionally includes successively combining each of the multiple panel matrices with the kernel to generate an output. Generating the multiple panel matrices can include mapping elements within a moving window of the input onto columns of an indexing matrix, where a size of the window corresponds to the size of the kernel.

20 Claims, 14 Drawing Sheets

(56) References Cited

OTHER PUBLICATIONS

"Deep Neural Network from scratch", https://matrices.io/deep-neural-network-from-scratch/, Apr. 2017, 58 pages.

International Search Report and Written Opinion of the International Searching Authority regarding International Patent Application No. PCT/KR2019/013863 dated Feb. 3, 2020, 10 pages.

Lym et al., "DeLTA: GPU Performance Model for Deep Learning Applications with In-depth Memory System Traffic Analysis", 2019 IEEE International Symposium on Performance Analysis of Systems and Software (ISPASS), IEEE, Mar. 2019, pp. 293-303.

Extended European Search Report in connection with counterpart European Patent Application No. 19926837.6 dated Mar. 10, 2022, 10 pages.

* cited by examiner

510

| H_0 | H_1 |
|---|---|
| H_2 | H_3 |

520

| X_0 | X_1 | X_2 | X_3 |
|---|---|---|---|
| X_4 | X_5 | X_6 | X_7 |
| X_8 | X_9 | X_10 | X_11 |
| X_12 | X_13 | X_14 | X_15 |

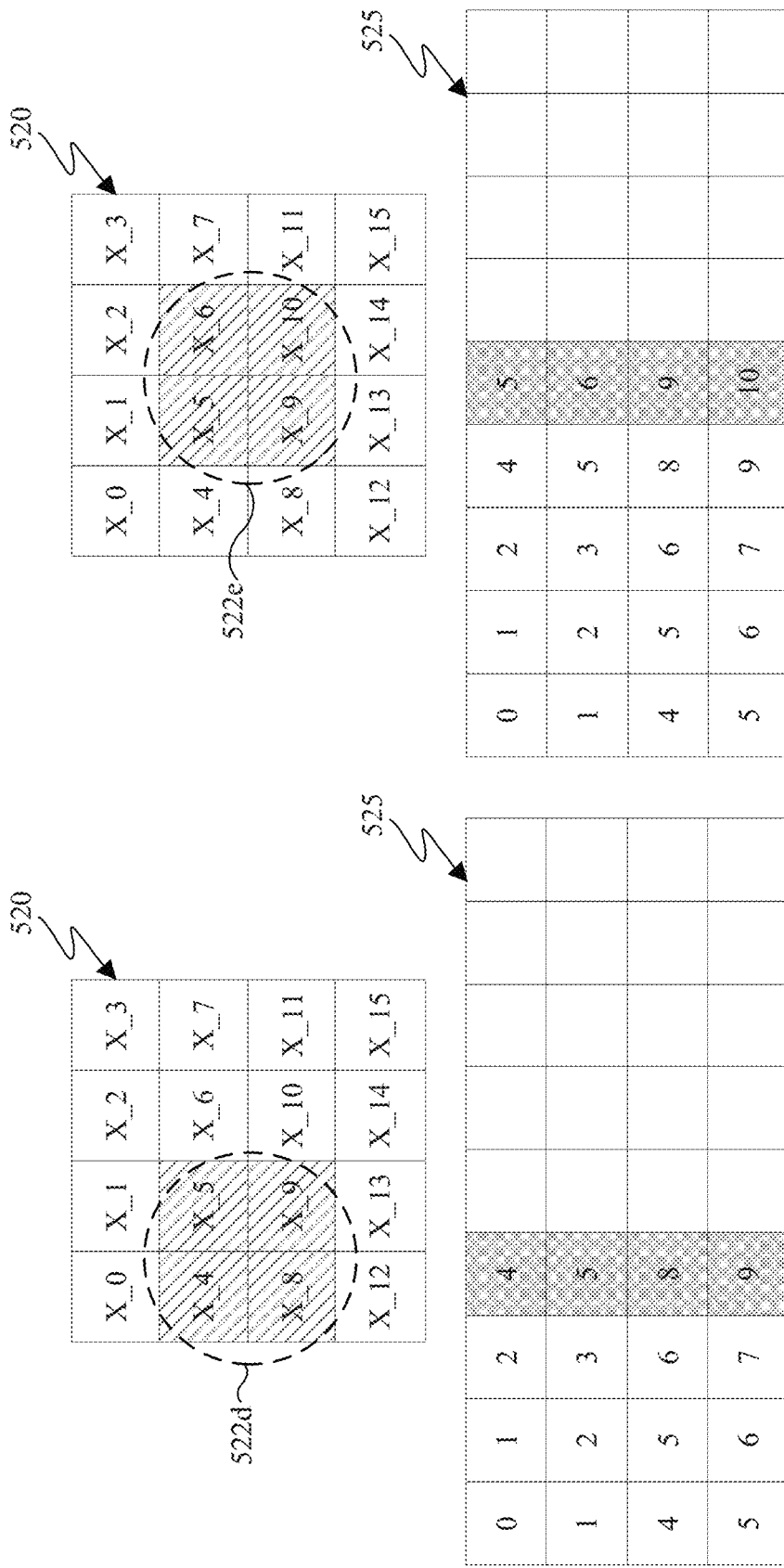

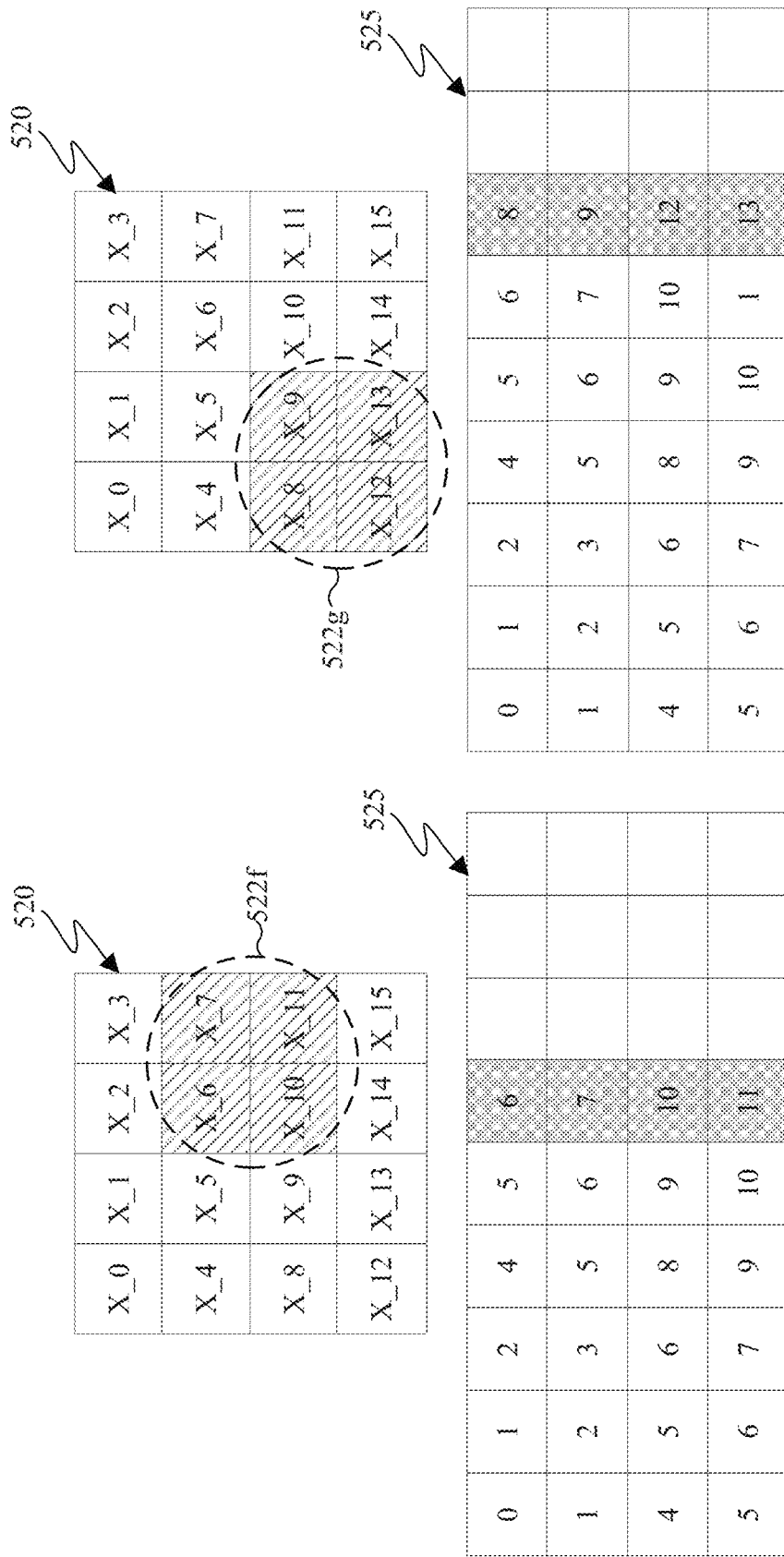

FIG. 5K

CONVOLUTION STREAMING ENGINE FOR DEEP NEURAL NETWORKS

TECHNICAL FIELD

This disclosure relates generally to neural networks. More specifically, this disclosure relates to convolution streaming for increasing compute efficiency of neural networks.

BACKGROUND

Deep learning or deep neural networks are a revolutionary force in artificial intelligence. Neural networks enable computers to make sense of huge amounts of data in various forms, such as images, sound, and text. Using multiple layers of neural perceptrons, computers now have the capacity to see, learn, and react to complex situations as well as, if not better than, humans. Deep learning networks are based on numerous layers, such as connected layers and convolution layers. Most deep learning networks rely heavily on the convolutional layers, as the convolutional layers typically account for over 90% of total computation of the neural network. One convolutional layer typically has tens of thousands to millions of small two-dimensional kernels.

SUMMARY

This disclosure provides a convolution streaming engine for deep neural networks.

In one embodiment, a method includes receiving an input into a neural network that includes a kernel. The method also includes generating, during a convolution operation of the neural network, multiple panel matrices based on different portions of the input. The method additionally includes successively combining each of the multiple panel matrices with the kernel to generate an output.

In another embodiment, an electronic device includes at least one processor. The at least one processor is configured to receive an input. The at least one processor is also configured to generate, during a convolution operation of the neural network that includes a kernel, multiple panel matrices based on different portions of the input. The at least one processor is additionally configured to successively combine each of the multiple panel matrices with the kernel to generate an output.

In yet another embodiment, a non-transitory computer readable medium embodies a computer program. The computer program includes computer readable program code that, when executed by at least one processor of an electronic device, causes the at least one processor to receive an input into a neural network that includes a kernel. The computer program also includes computer readable program code that, when executed, causes the at least one processor to generate, during a convolution operation of the neural network, multiple panel matrices based on different portions of the input. The computer program additionally includes computer readable program code that, when executed, causes the at least one processor to successively combine each of the multiple panel matrices with the kernel to generate an output.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 5A illustrates an example kernel and input feature map for a neural network in accordance with an embodiment of this disclosure;

FIGS. 5B, 5C, 5D, 5E, 5F, 5G, 5H, 5I, and 5J illustrate an example process of creating an indexing matrix in accordance with an embodiment of this disclosure;

FIG. 5K illustrates an example process of combining a modified version of a kernel and a reshuffled feature map in accordance with an embodiment of this disclosure;

DETAILED DESCRIPTION

Figure 1:
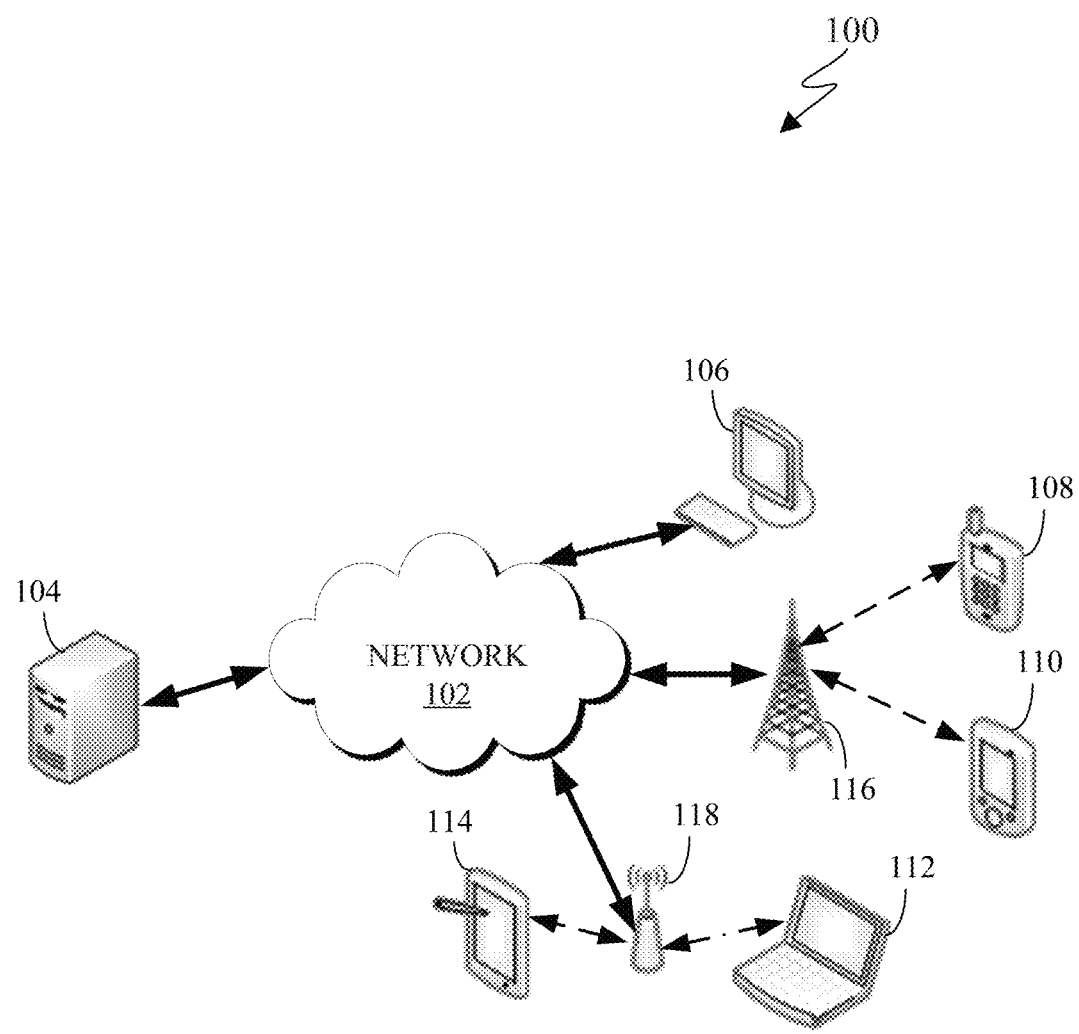
FIG. 1 illustrates an example communication system in accordance with embodiments of this disclosure.

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably-arranged system or device.

An electronic device, according to embodiments of this disclosure, can include personal computers (such as a laptop or a desktop), a workstation, a server, a television, an appliance, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. Additionally, the electronic device as disclosed herein is not limited to the above-listed devices and can include new electronic devices depending on the development of technology. It is noted that, as used here, the term "user" may denote a human or another device (such as an artificial intelligent electronic device) using the electronic device.

A neural network is a combination of hardware and software that is patterned after the operations of neurons in a human brain. Neural networks can be a standalone system or included in another electronic device. Neural networks solve and extract information from complex signal processing, pattern recognition, or pattern production. Pattern recognition includes the recognition of objects that are seen, heard, felt, and the like.

A neural network can have a parallel architecture. Information that is represented, processed, and stored by a neural network can vary. The inputs to a neural network are processed as patterns of signals that are distributed over discrete processing elements, rather than binary numbers.

Structurally, a neural network involves a large number of processors that operate in parallel and are arranged in tiers. For example, the first tier receives raw input information, and each successive tier receives the output from the preceding tier. Each tier is highly interconnected such that each node in tier n can be connected to multiple nodes in tier n−1 (such as the nodes inputs) and in tier n+1 that provides input for those nodes. Each processing node includes a set of rules that it was originally given or developed for itself over time.

A neural network can be initially trained. Training typically involves providing a specific input to the neural network and instructing the neural network what output is expected. As a particular example, a neural network can be trained to identify when a user interface object is to be modified. For instance, a neural network can receive initial inputs, such as data from observable features. By providing the initial answers, the training allows a neural network to adjust how the neural network internally weighs a particular decision to perform a given task. In some embodiments, the neural network can also receive feedback data. Feedback data allows a neural network to improve various decisions and weighing processes of subsequent tasks by removing false positives which can increase the accuracy and efficiency of each decision. As a result, neural networks are adaptable such that a neural network can modify its outputs based on the initial training and feedback data.

A convolutional neural network (CNN) is a class of deep learning neural networks. A CNN is often used to analyze visual images. A CNN includes an input and an output, as well as multiple hidden layers. Each hidden layer of a CNN can include one or more pooling layers, one or more normalization layers, one or more connected layers, and one or more convolution layers. The pooling layers combine the outputs of neuron clusters at one layer into a single neuron for the next sequential layer. For example, if the pooling layer is a maximum pooling layer, the pooling layer identifies a maximum value from each cluster of neurons at a prior layer and provides the identified maximum values to the next layer. In another example, if the pooling layer is an average pooling layer, the pooling layer identifies the average value from each cluster of neurons of the prior layer and provides the identified average values to the next layer. Pooling layers can be local pooling layers, global pooling layers, or a combination thereof. Normalization layers normalize the outputs from one layer and input the normalized values into the next layer. Fully-connected layers of a CNN connect neurons in one layer to neurons in another layer. In some embodiments, the fully-connected layers can connect every neuron in one layer to every neuron in another layer.

Convolution layers account for a large percentage of the computations of a neural network. A convolution layer applies a convolution operation to its input in order to generate a result. The result is then passed to the next layer for another convolution operation. The convolution process imitates the response of an individual neuron of a human to visual stimuli. For example, each convolutional neuron can process data only for its respective field. Therefore, large numbers of neurons are used due to large input sizes associated with images, as each pixel of an image is a relevant variable of the neural network.

The architecture of a neural network provides that each neuron can modify the relationship between inputs and outputs by some rule. One type of neural network is a feed forward network in which information is passed through nodes but does not touch the same node twice. A CNN can be referred to as a feed-forward neural network. Another type of neural network is a recurrent neural network. A recurrent neural network can include at least one feedback loop that allows a node to be provided with past decisions. A recurrent neural network can include multiple layers in which each layer includes numerous cells called long short-term memory ("LSTM"). An LSTM can include an input gate, an output gate, and a forget gate. A single LSTM can remember a value over a period of time and can assist in preserving an error that can be back propagated through the layers of the neural network.

Embodiments of this disclosure also take into consideration that configurations of a neural network can affect the efficiency of the convolution operation at each of the convolution layers. Since a large percentage of the computations of a neural network are performed at the convolution layers, embodiments of this disclosure provide systems and methods for performing convolutions within a neural network efficiently, regardless of the specific configuration of the neural network. For example, embodiments of this disclosure provide a process for efficiently performing convolutions within a neural network regardless of the given configurations such as the feature map size (or dimension), the depth, the kernel size, the size of the channel, the stride size, the padding size, and the like, which are used within any given CNN.

Embodiments of this disclosure provide systems and methods for converting a convolution operation into a matrix multiplication operation. A converted input can be decomposed into multiple smaller matrices, such as panel matrices or partitions. The process can then provide the panel matrices into a matrix multiplication engine. The matrix multiplication engine multiplies a kernel of the CNN against the panel matrices for as long as new panel matrices are provided to the matrix multiplication engine. As a result, the compute efficiency of a convolution operation can be determined by the parameters of the matrix multiplication engine and not by the various configurations that are associated with the components (such as feature map size, kernel size, output channel, stride, padding, and the like) of the CNN. Therefore, one or more convolution layers of a CNN can each include a consistent efficiency rating for an arbitrary CNN configuration by streaming the data, such as panel matrices, to the matrix multiplication engine.

FIG. 1 illustrates an example communication system 100 in accordance with embodiments of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes or implements a neural network, such as a CNN.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can include a user interface engine that modifies one or more user interface buttons displayed to a user on a touchscreen. In some embodiments, any of the client devices 106-114 includes or implements a neural network, such as a CNN.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
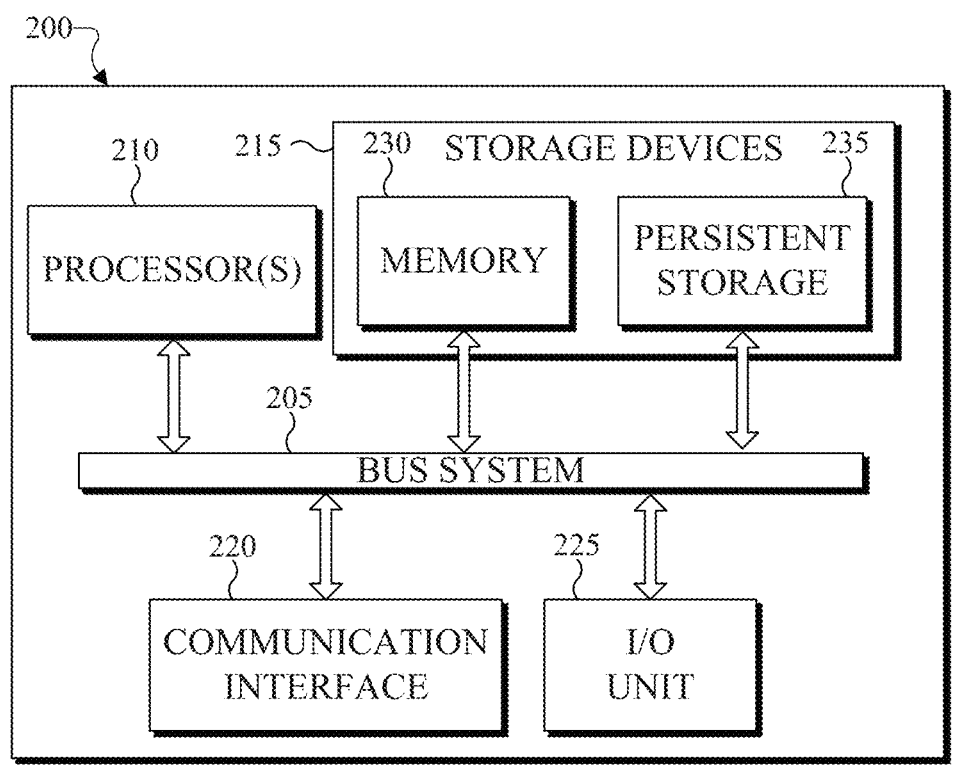
FIG. 2 illustrates an example server in accordance with an embodiment of this disclosure.
Figure 3:
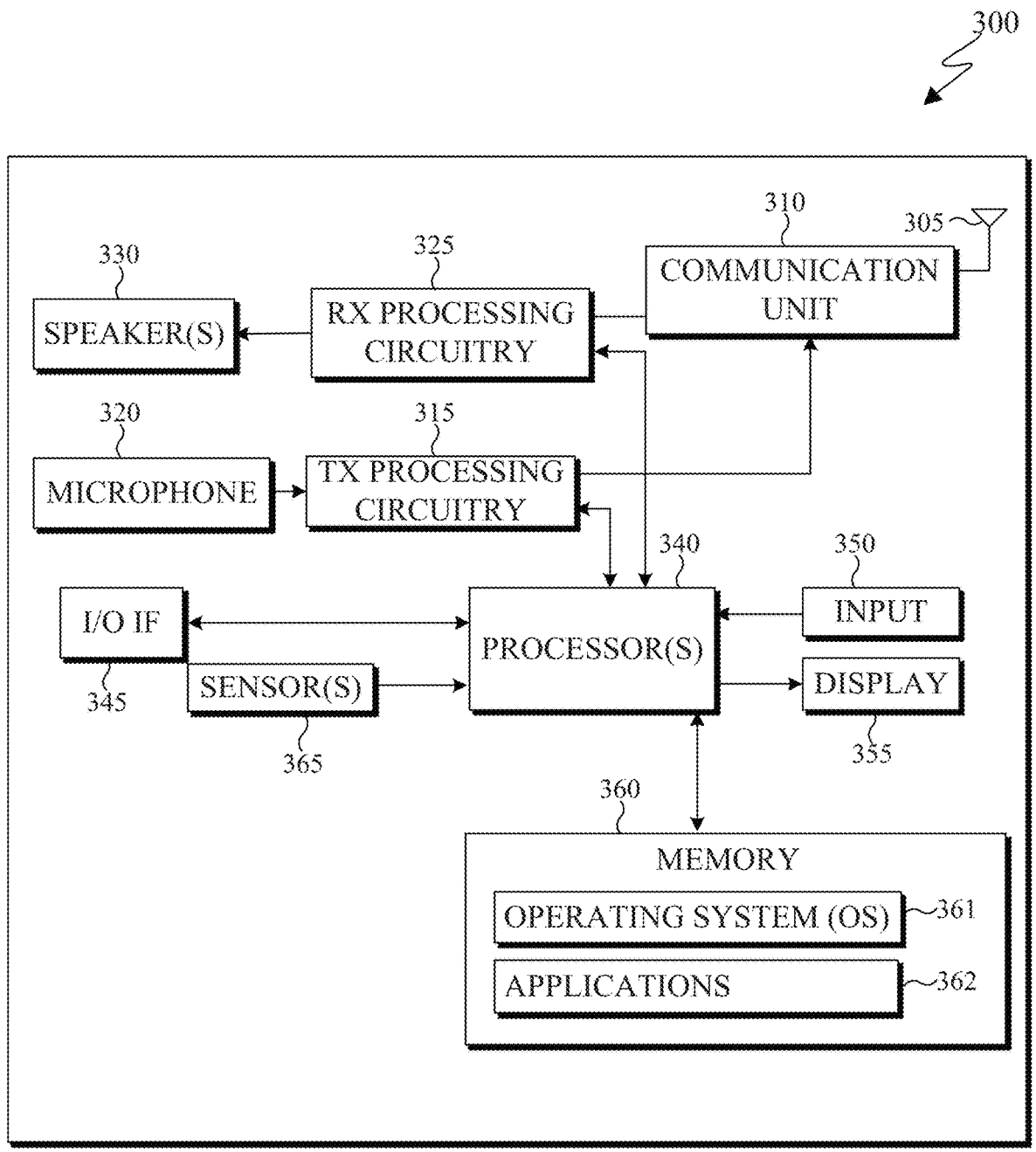
FIG. 3 illustrates an example electronic device in accordance with an embodiment of this disclosure.

FIGS. 2 and 3 illustrate example devices in a communication system, such as the communication system 100 in FIG. 1, in accordance with embodiments of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, a neural network, and the like. The server 200 can be accessed by one or more of the client devices 106-114.

As shown in FIG. 2, the server 200 includes a bus system 205 that supports communication between at least one processing device 210, at least one storage device 215, at least one communications interface 220, and at least one input/output (I/O) unit 225.

The processing device 210, such as a processor, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a RAM or any other suitable volatile or non-volatile storage device(s). The persistent storage 235 can contain one or more components or devices supporting longer-term storage of data, such as a hard drive, ROM, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. In some embodiments, the electronic device 300 is useable with data transfer applications, such providing and receiving information from a neural network. In other embodiments, the electronic device 300 includes or implements a neural network. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361, in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing an input into a neural network. The processor 340 can move data into or out of the memory 360 as required by an executing process. In some embodiments, the processor 340 is configured to execute a plurality of applications 362 based on the OS 361 or in response to signals received from external source(s) or an operator. Example applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing, thereby allowing a user to input a voice command. As another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. Input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of devices in a communication system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4A:
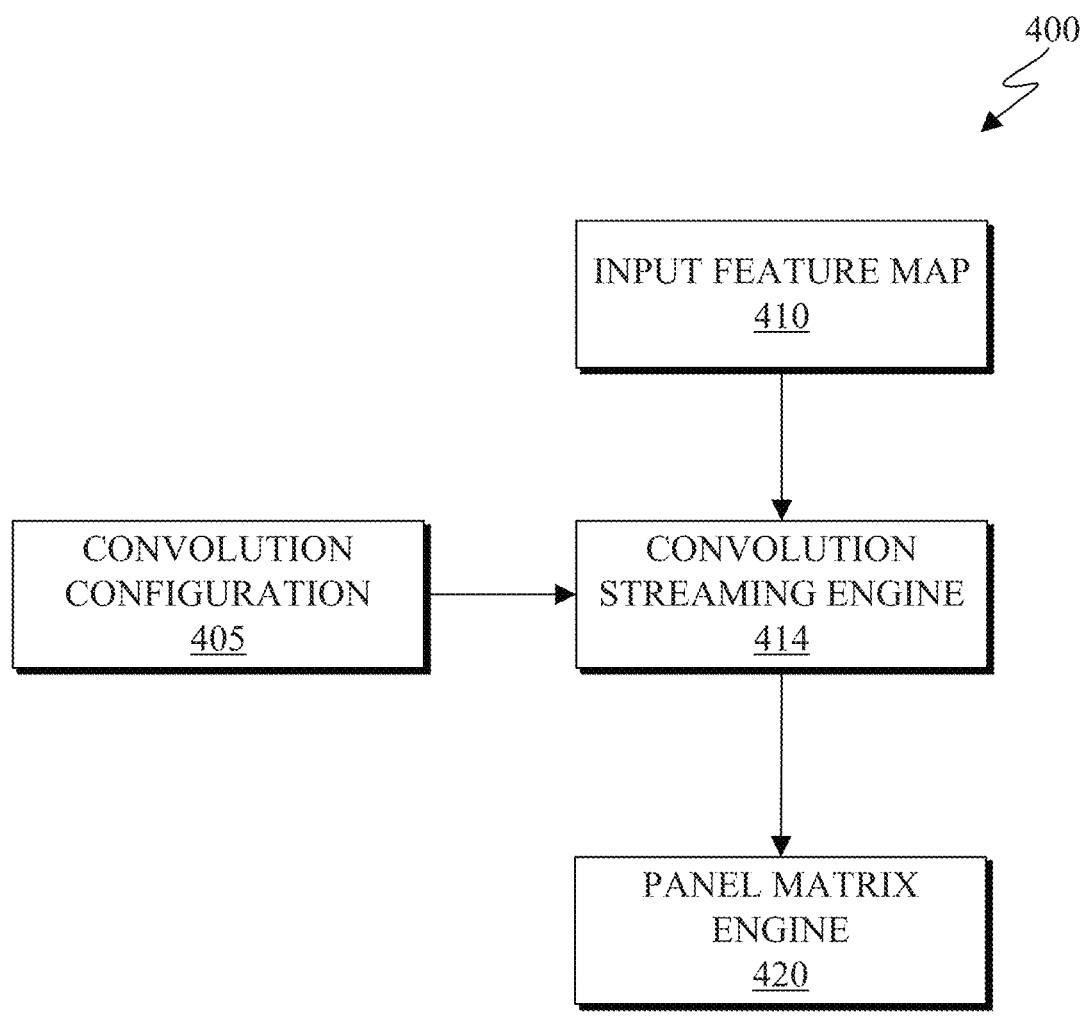
FIG. 4A illustrates an example high-level architecture of a convolution operation in accordance with an embodiment of this disclosure.
Figure 4B:
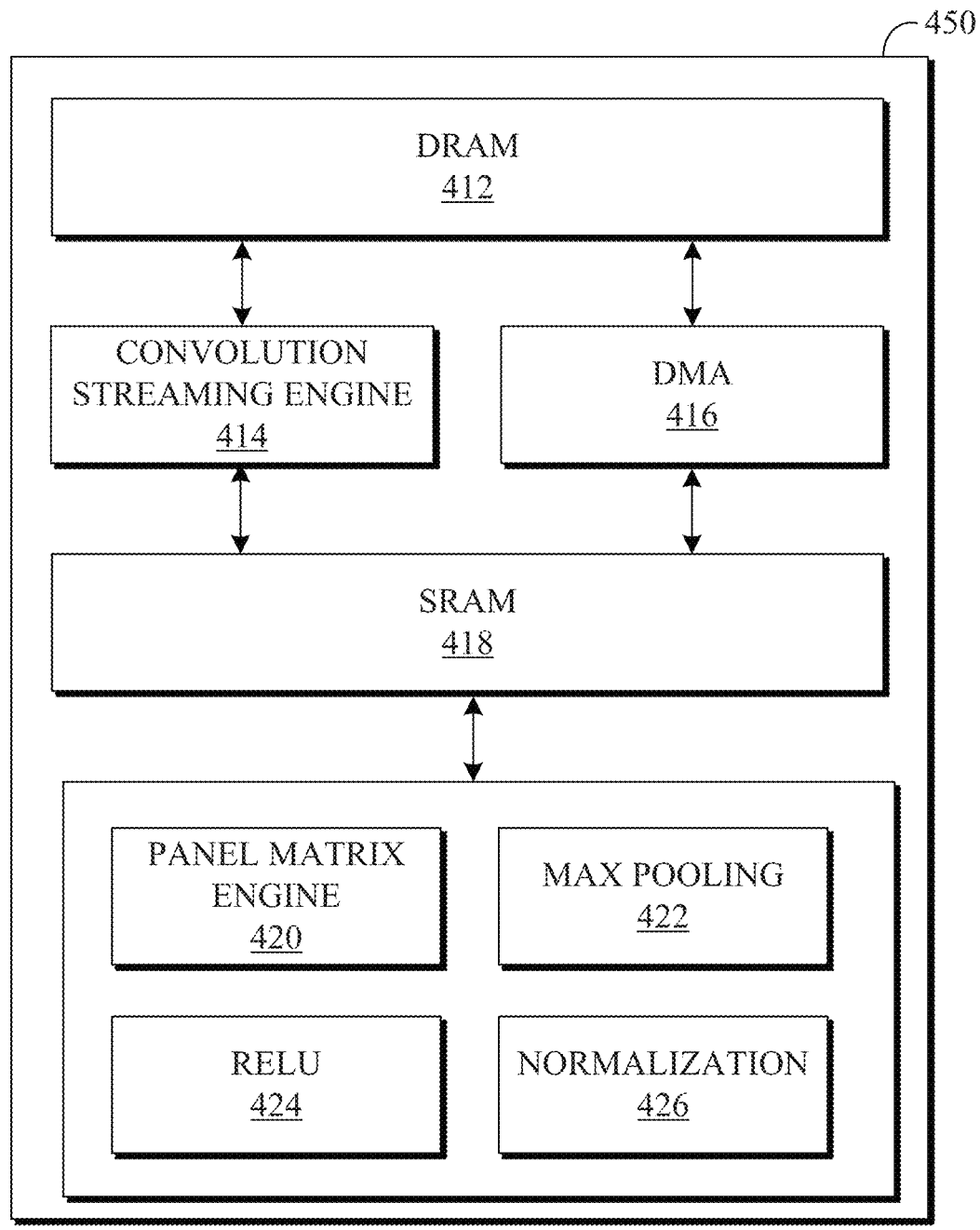
FIG. 4B illustrates a block diagram of an example electronic device in accordance with an embodiment of this disclosure.

FIG. 4A illustrates an example high-level architecture 400 of a convolution operation in accordance with an embodiment of this disclosure. FIG. 4B illustrates a block diagram of an example electronic device 450 in accordance with an embodiment of this disclosure. For example, the high-level architecture 400 illustrates a modified convolution operation based on matrix multiplication using the electronic device 450. The embodiments of the high-level architecture 400 shown in FIG. 4A and the electronic device 450 shown in FIG. 4B are for illustration only. Other embodiments can be used without departing from the scope of this disclosure.

FIG. 4A illustrates an example high-level architecture 400 of a convolution operation in accordance with an embodiment of this disclosure. An input feature map 410 is the input for a convolution operation. The convolution operation is performed by a convolution streaming engine 414 and a panel matrix engine 420. The input feature map 410 represents the initial input to a neural network that is used in a convolution operation as well as a generated result of a convolution operation. For example, kernels using different weights can be used for different convolutions, thereby creating different feature maps. Each feature map is then passed to the next layer of the neural network. The input feature map 410 represents a feature map of a prior layer of the neural network. The outcome of the process performed by the high-level architecture 400 can be another feature map similar to the input feature map 410. For instance, the output of the process performed by the high-level architecture 400 is another feature map that is used in the next layer of the neural network, and this process is repeated for each sequential layer of the neural network. The process performed by the high-level architecture 400 is repeated using the output of the previous layer as the input feature map 410 for the next sequential layer. In some embodiments, the size of the input feature map 410 can change based on the depth of the neural network. For example, as the number of layers of the neural network increases, the size of the input feature map can decrease based on the quantity of convolutions that have previously occurred.

A convolution configuration 405 provides the convolution streaming engine 414 with a configuration setting or parameter for a convolution operation. In some embodiments, the convolution configuration 405 provides multiple configuration settings or parameters to the convolution streaming engine 414 for a convolution operation. For example, in some embodiments, the convolution configuration 405 can provide the size of the feature map (such as the input feature map 410) to the convolution streaming engine 414. The size of the feature map can be expressed as the area of the height (H), width (W), and channel (C). For example, the feature map can be expressed as in Equation (1). Also, in some embodiments, the convolution configuration 405 can provide the convolution streaming engine 414 with the size of the kernel (K) where (K) is the length or height of the kernel. For example, the size of the kernel can be a square matrix as expressed in Equation (2).

$$\text{Feature Map Size} = H*W*C \quad (1)$$

$$\text{Kernel Size} = K*K \quad (2)$$

Further, in some embodiments, the convolution configuration 405 can provide the output channel (D) to the convolution streaming engine 414. Moreover, in some embodiments, the convolution configuration 405 can provide the stride (S) to the convolution streaming engine 414. In addition, in some embodiments, the convolution configuration 405 can provide the padding (P) to the convolution streaming engine 414. One, some, or all of these parameters can be included in the convolution configuration 405 and provided to the convolution streaming engine 414.

Generally, when one or more of the convolution configuration 405 are changed, the compute efficiency for the neural network can change. Beyond that, the compute efficiency for the neural network can be increased, regardless of the convolution configuration 405, by having the convolution streaming engine 414 convert the input feature map 410 into an indexing matrix, based on the settings or parameters of the convolution configuration 405. The indexing matrix can be created based on the size of the kernel, as indicated by the convolution configuration 405. That is, the convolution streaming engine 414 can determine how to create the indexing matrix by mapping the input feature map 410 based on the parameters indicated by the convolution configuration 405. The convolution streaming engine 414 can then convert the indexing matrix into a reshuffled feature map (or a reshuffled matrix) that represents the input feature map. The reshuffled feature map is organized such that the data of the input feature map is positioned and arranged to match the order of the indexing matrix. To convert the indexing matrix into the reshuffled feature map, the convolution streaming engine 414 places the content of each cell of the input feature map 410 into a corresponding location of the indexing matrix.

The convolution streaming engine 414 then provides individual panel matrices representing portions of the reshuffled feature map as an input to the panel matrix engine 420. The panel matrix engine 420 then combines each received panel matrix with a kernel for the convolution operation. For example, the panel matrix engine 420 multiples a kernel by each panel matrix that is received from the convolution streaming engine 414.

FIG. 4B illustrates the electronic device 450 which includes or implements an example CNN with a convolution streaming engine such as the high-level architecture 400. In some embodiments, the components shown here can be included in a single device, such as a server 104 or 200, a client device 106-114, or an electronic device 300. In other embodiments, portions of the components shown here can be included in different devices, such as multiple servers 104 or 200, multiple client devices 106-114, multiple electronic devices 300, or a combination of different devices.

As shown in FIG. 4B, the electronic device 450 includes a direct random access memory (DRAM) 412, a convolution streaming engine 414, a direct memory access (DMA) 416, a static random access memory (SRAM) 418, a panel matrix engine 420, a max pooling layer 422, a rectified linear unit (RELU) 424, and a normalization layer 426.

A CNN can perform any number of convolutions, batch normalizations, RELU calculations, and pooling operations depending on the neural network. A convolution layer performs convolutions between an input of data (such as an image) and a filter or kernel. The input of data is referred to as a feature map, such as the input feature map 410. Kernels using different weights can be used for additional convolutions, modifying the feature map, or creating new feature maps as a result of each convolution. Each feature map can be passed to the next layer of the neural network, such as for additional convolution operations. Other layers of the CNN can support batch normalization (such as by the normalization layer 426), RELU (such as by the RELU 424), pooling (such as by the max pooling layer 422), and the like.

The DRAM 412 is a type of RAM and can store input data, weight parameters that are associated with the neural network, or other data. In some embodiments, data is stored in the DRAM 412 and then written to on-chip memory, such as the SRAM 418, when the data is used by the processor(s) for the neural network. In some CNNs, the input feature map 410 is stored in the DRAM 412. For example, each layer of a convolution neural network could read its input feature map (such as the input feature map 410) from the DRAM 412 to on-chip memory, such as SRAM 418, and write the output of the convolution operation (such as a modified input feature map 410) back to the DRAM 412. While a CNN is processing all inputs and generating the final output, the original data can remain in the DRAM 412 during the entire process, and new data created by the neural network can be written to the DRAM 412 while the neural network continues to operate.

The DMA 416 enables the SRAM 418 to access the data within the DRAM 412. For example, the DMA 416 can fetch weights and data from the DRAM 412 when the data or weights are needed by the processor(s) for the neural network. The SRAM 418 is a type of RAM. In some embodiments, the SRAM 418 manages the weights for convolution layers.

The convolution streaming engine 414 converts the feature map into an indexing matrix to increase compute efficiency of the neural network when performing convolution operations. Additionally, the convolution streaming engine 414 generates smaller panel matrices based on the indexing matrix. The convolution streaming engine 414 then provides the smaller panel matrices to the panel matrix engine 420 so that the panel matrix engine 420 is not stalled waiting for data to become available. For example, after generating the smaller panel matrices based on the indexing matrix, the convolution streaming engine 414 can continually provide the panel matrices to the panel matrix engine 420 for use. In some embodiments, the convolution streaming engine 414 creates the indexing matrix and then generates the panel matrices. In other embodiments, the convolution streaming engine 414 generates the panel matrices while creating the indexing matrix. Regardless of the order in which the convolution streaming engine 414 creates the indexing matrix and the panel matrices, the convolution streaming engine 414 provides a single panel matrix at a time to the panel matrix engine 420. Since there is a continual flow of data from the convolution streaming engine 414 to the panel matrix engine 420, the panel matrix engine 420 does not need to wait for a new panel matrix (or may wait by much smaller amounts of time), which decreases stall times and increases the compute efficiency of the convolution neural network. The compute efficiency of the overall convulsion computations is based on the panel matrix engine 420 and not the specific configuration for each convolution.

The convolution streaming engine 414 converts the input feature map into an indexing matrix. The convolution streaming engine 414 then uses the indexing matrix to create the reshuffled feature map which is used to generate multiple panel matrices. In some embodiments, the indexing matrix is stored in the SRAM 418. In other embodiments, the indexing matrix and each panel matrix are stored in the SRAM 418. Also, in some embodiments, each panel matrix is stored in the SRAM 418 with an indication as to the size of the panel matrix. Moreover, in some embodiments, the convolution streaming engine 414 can convert the indexing matrix into the reshuffled feature map such that each element of the indexing matrix includes data from the input feature map of a convolution operation, such as the input feature map 410. The reshuffled feature map can be stored in the SRAM 418. In some embodiments, the reshuffled feature map is generated on the fly as each panel matrix is generated. It should be noted that the indexing matrix, the panel matrices, the reshuffled feature map, or a combination thereof, can also or alternatively be stored in the DRAM 412 and fetched by the DMA 416 to be stored in the SRAM 418 for processing by the panel matrix engine 420. The size of each panel matrix can be based on the compute capacity of the electronic device 450. That is, the size of each panel matrix can be predetermined based on the internal configuration of the electronic device 450. For example, if the tensor processor is 64 MACS/cycle, the panel size can be four.

In some embodiments, the convolution streaming engine 414 coupled with the panel matrix engine 420 translates a convolution operation into a matrix multiplication problem. For example, the panel matrix engine 420 combines a kernel of the CNN with each panel matrix that is provided by the convolution streaming engine 414. The convolution streaming engine 414 manipulates and re-organizes the input feature map 410 to create an indexing matrix, such as by mapping the identification number of each cell of the input feature map 410 to a cell of the indexing matrix. In some embodiments, the convolution streaming engine 414 manipulates and re-organizes the input feature map 410 based on the convolution configuration 405 that are associated with the neural network. As described above, the convolution configuration 405 includes the sizes of the input feature map and the size of the kernel. For instance, the size of the input feature map can be an M×M matrix and the size of the kernel can be an N×N matrix, where 'M' and 'N' are different integer values.

The convolution streaming engine 414 reshuffles the input feature map 410 while maintaining the kernel. Maintaining the kernel ensures that the size of the kernel is unchanged while creating the reshuffled feature map based on the indexing matrix. The indexing matrix is larger in size than the input feature map 410, and the reshuffled feature map is larger than the input feature map 410 since the numbers of rows and columns of the indexing matrix and the reshuffled feature map are the same. It should be noted that (i) the indexing matrix represents the individual cells of the input feature map 410 and (ii) the reshuffled feature map represents the data corresponding to the individual cells of the input feature map 410 at the location of the corresponding cell of the indexing matrix. Therefore, the reshuffled feature map includes many repeated elements from the input feature map. As a result, in some embodiments, the indexing matrix is stored in memory, while the reshuffled feature map is not stored in memory due to its size and is instead regenerated on the fly as needed. However, if suitable memory is available, the reshuffled feature map can be stored in memory. Also, in some embodiments, the indexing matrix or the reshuffled feature map can be highly compressible. Therefore, the indexing matrix or the reshuffled feature map can be compressed, and panel matrices can be generated or retrieved on the fly.

Each panel matrix (or partition) is provided to the panel matrix engine 420. The panel matrix engine 420 performs matrix multiplication with each panel matrix. For example, the panel matrix engine 420 receives panel matrices and multiples each panel matrix by the kernel. The generated output is similar to the result a convolution operation for the neural network. The panel matrix engine 420 can continually receive panel matrices for matrix multiplication such that the panel matrix engine 420 is not stalled waiting for the next set of data to become available. The panel matrix engine 420 multiples each subsequent panel matrix by the kernel to efficiently compute the convolution operation. As a result, the overall efficiency of the neural network is based on the compute efficiency of the panel matrix engine 420 and not the specific configurations of the neural network itself. As a particular example, for two-dimensional convolution, the translated operation is similar to matrix vector multiplication. That is, the panel matrix engine 420 multiples each sequentially received panel matrix by the kernel to generate an output. After multiplying each of the panel matrices by the kernel, the panel matrix engine 420 can reconstruct a modified feature map from the output for the next convolution operation.

The max pooling layer 422 supports a method of pooling the maximum value of a sub-region of an image or feature map. In some embodiments, the max pooling layer 422 down samples images or feature maps to allow for more efficient processing by subsequent layers of the neural network. For example, when using the max pooling layer 422 in a neural network, only the highest value in a sub-region is retained, and all other values are discarded. For instance, in a 2×2 max pooling layer, out of four elements in the pooling window or sub-region, only one value is extracted, and the other three are discarded. In other embodiments, the max pooling layer 422 can support other types of pooling, such as mean or average pooling. For example, a pooling layer can combine the output values from one convolutional layer into input values for the next layer.

The RELU 424 represents a layer in the neural network that applies an activation function to increase the nonlinear properties of the network. For example, an activation function can zero out negative values. In some embodiments, the RELU 424 ensures that none of its output values is negative. The normalization layer 426 represents a layer in the neural network that can be used to normalize the activation of each convolution layer. The normalization layer 426 can normalize the outputs from one layer and input the normalized values into the next layer.

Although FIG. 4A illustrates one example of a high-level architecture 400 of a convolution operation and FIG. 4B illustrates one example of an electronic device 450, various changes may be made to FIGS. 4A and 4B. For example, any other suitable arrangement of memory could be used in FIG. 4B, and the operations shown in FIGS. 4A and 4B could occur any number of times and in various ways.

Figure 5D:
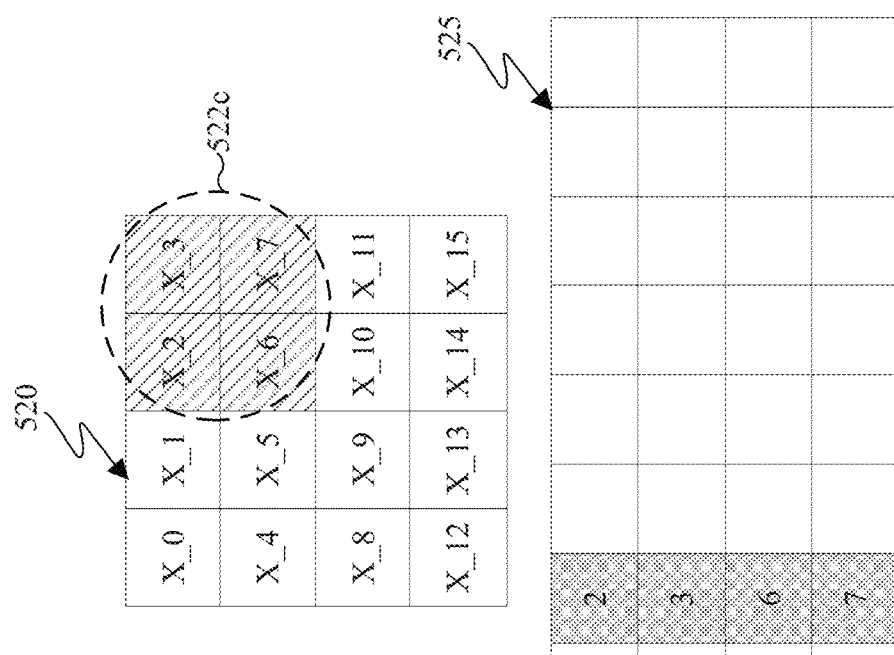

FIG. 5A illustrates an example kernel 510 and input feature map 520 for a neural network in accordance with an embodiment of this disclosure. FIGS. 5B, 5C, 5D, 5E, 5F, 5G, 5H, 5I, and 5J illustrate an example process of creating an indexing matrix 525 in accordance with an embodiment of this disclosure. FIG. 5K illustrates an example process of combining a modified version of the kernel 510 and a reshuffled feature map in accordance with an embodiment of this disclosure. FIGS. 5A-5K therefore represents an example process of convolution streaming for a neural network. The operations shown in FIGS. 5A-5K can be performed by one or more components, such as by the convolution streaming engine 414 and the panel matrix engine 420 of the electronic device 450.

As shown in FIG. 5A, the kernel 510 is represented as a 2×2 matrix that includes the elements 'H_0,' 'H_1,' 'H_2,' and 'H_3.' The input feature map 520 is similar to the input feature map 410 of FIG. 4A. The input feature map 520 is represented as a 4×4 matrix that includes elements 'X_0,' 'X_1,' 'X_2,' 'X_3,' 'X_4,' 'X_5,' 'X_6,' 'X_7,' 'X_8,' 'X_9,' 'X_10,' 'X_11,' 'X_12,' 'X_13,' 'X_14,' and 'X_15.' As discussed above, the input feature map 520 can be any size, such as an M×M matrix. Similarly, the kernel 510 can be any size, such as an N×N matrix. It should be noted that the variables 'H' and 'X' represent data, while the integers '0' through '15' represent the corresponding cell that the data is associated with. Given this notation, the output from a convolution based on the kernel 510 and the input feature map 520 can be expressed as in Equation (3).

$$\text{Output}=(M-N+1)*(M-N+1) \tag{3}$$

FIG. 5B illustrates the first step in creating an indexing matrix in accordance with an embodiment of this disclosure. Since the kernel 510 is a 2×2 matrix, 2×2 portions of the input feature map 520 are mapped onto the indexing matrix 525. A window is created that has the same size as the kernel 510, namely 2 columns and 2 rows in this example (although other kernel and window sizes can be used). The window can start in any location of the input feature map 520, as long as each element within the input feature map 520 is mapped onto the indexing matrix 525 during the mapping process. In this example, an area 522a represents the window and starts in the top left corner of the input feature map 520.

The elements within the area 522a of the input feature map 520 are mapped onto a 4×1 portion of the indexing matrix 525. That is, the elements within the area 522a of the input feature map 520 are mapped into a single column of the indexing matrix 525. In some embodiments, the data of the input feature map 520 is not moved into the indexing matrix; rather, the cell number indicated by the integer is mapped to the indexing matrix 525. Since the area 522a represents the first mapping, the cell numbers within the area 522a are mapped to the first column of the indexing matrix 525. Each cell number within the area 522a is mapped a respective row of the indexing matrix 525 such that the data elements represented by 'X_0,' 'X_1,' 'X_4,' and 'X_5' are mapped into respective rows and represented by their index location of 0, 1, 4, and 5, respectively. In some embodiments, the top row is mapped left to right, and then the second row is mapped left to right to form the single column. In other embodiments, alternative mapping orders are possible.

Figure 5C:
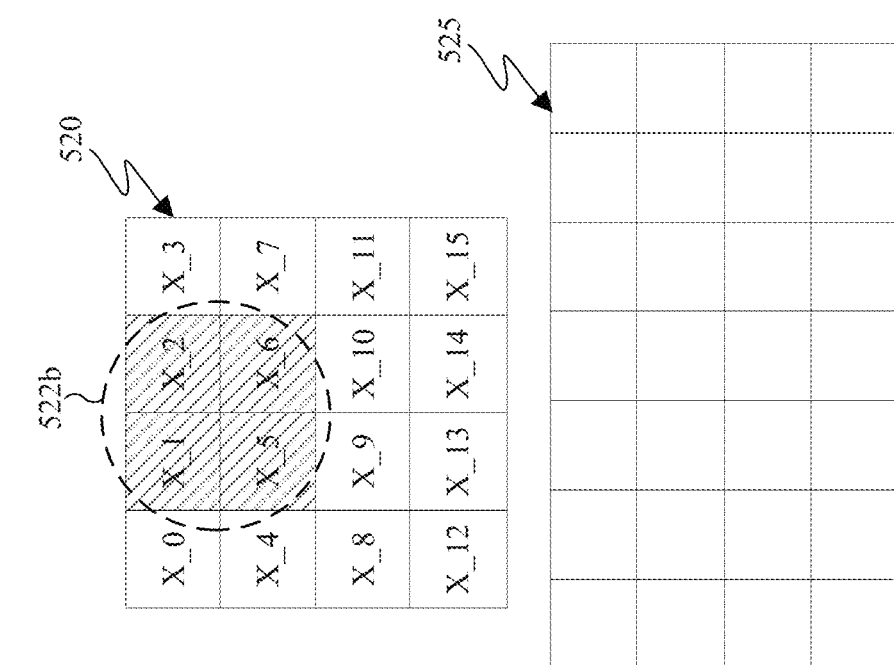

FIG. 5C illustrates the second step in creating an indexing matrix in accordance with an embodiment of this disclosure. The window here, as indicated by an area 522b, has been shifted to the right by a single column. The elements within the area 522b of the input feature map 520 are mapped to the next 4×1 portion of the indexing matrix 525. That is, the elements within the area 522b of the input feature map 520 are mapped onto the second column of the indexing matrix 525. Since the area 522b represents the second mapping, the cell numbers within the area 522b are mapped to the second column of the indexing matrix 525. Each cell number within the area 522b is mapped a respective row of the indexing matrix 525 such that the data elements represented by 'X_1,' 'X_2,' 'X_5,' and 'X_6' are mapped into respective rows and represented by their index location of 1, 2, 5, and 6, respectively. Again, the top row is mapped left to right and then the second row is mapped left to right to form the single column, but alternative mapping orders are possible.

FIG. 5D illustrates the next step in creating an indexing matrix in accordance with an embodiment of this disclosure. The window here, as indicated by an area 522c, has been shifted to the right by a single column. The elements within the area 522c of the input feature map 520 are mapped to the next 4×1 portion of the indexing matrix 525. That is, the elements within the area 522c of the input feature map 520 are mapped onto the third column of the indexing matrix 525. Since the area 522c represents the third mapping, the cell numbers within the area 522c are mapped to the third column of the indexing matrix 525. Each cell number within the area 522c is mapped a respective row of the indexing matrix 525 such that the data elements represented by 'X_2,' 'X_3,' 'X_6,' and 'X_7' are mapped into respective rows and represented by their index location of 2, 3, 6, and 7 respectively. Again, the top row is mapped left to right and then the second row is mapped left to right to form the single column, but alternative mapping orders are possible.

FIGS. 5E, 5F, and 5G illustrate the next three steps in creating an indexing matrix in accordance with an embodiment of this disclosure. In FIG. 5E, the window as indicated by an area 522d has been shifted down a single row and returned to the left most column. In FIG. 5F, the window as indicated by an area 522e has been shifted to the right by a single column. In FIG. 5G, the window as indicated by an area 522f has again been shifted to the right by a single column. Again, the same mappings from the cells of the input feature map 520 to the columns of the indexing matrix 525 are made, although alternative mapping orders are possible.

Figures 5I, 5J:
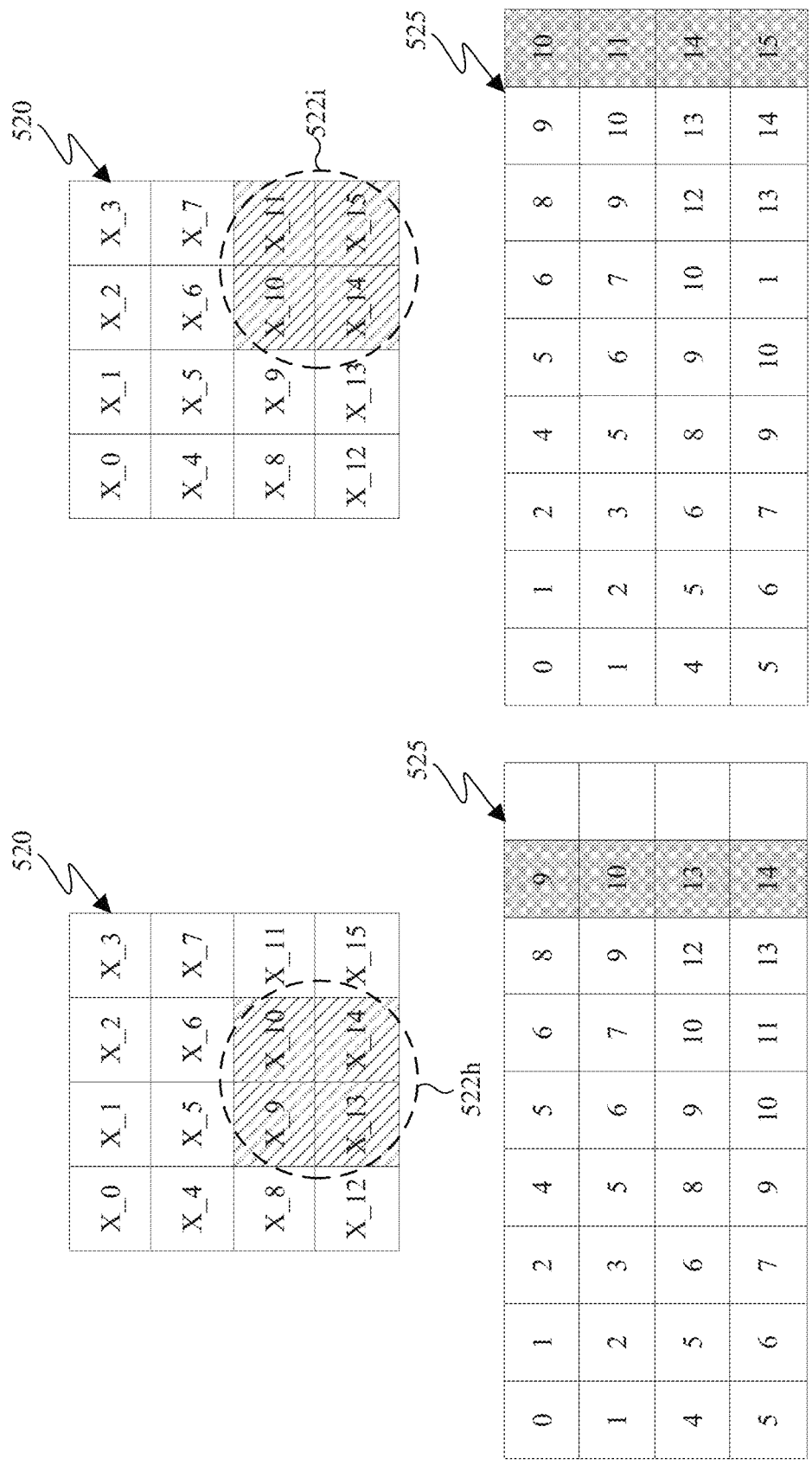
Figure 5K:
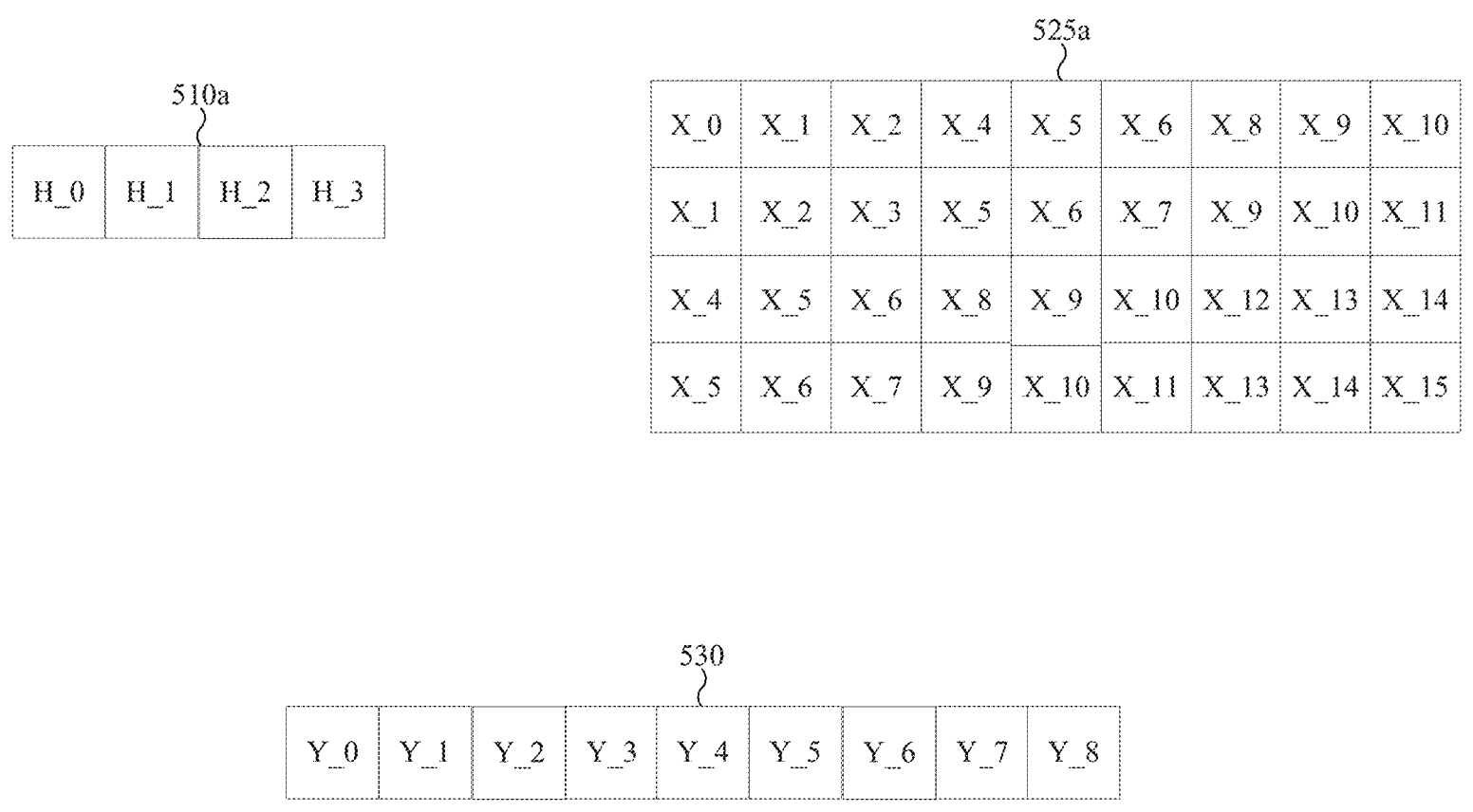

FIGS. 5H, 5I, and 5J illustrate the final three steps in creating an indexing matrix in accordance with an embodiment of this disclosure. In FIG. 5H, the window as indicated by an area 522g has been shifted down a single row and returned to the left most column again. In FIG. 5I, the window as indicated by an area 522h has been shifted to the right by a single column. In FIG. 5J, the window as indicated by an area 522i has again been shifted to the right by a single column. Again, the same mappings from the cells of the input feature map 520 to the columns of the indexing matrix 525 are made, although alternative mapping orders are possible.

As will be apparent here, these particular mappings are based on the assumption of a 2×2 kernel 510 and a 4×4 input feature map 520. Of course, the number of rows in the indexing matrix 525 can vary based on the size of the kernel, and similarly the number of columns in the indexing matrix 525 can vary based on the size of the input feature map. It should also be noted that rows and columns here can be reversed if desired.

FIG. 5K illustrates an example process of combining a modified version of the kernel (denoted 510a) and a reshuffled feature map 525a (which is based on the indexing matrix 525 of FIG. 5J but includes the actual data of the input feature map 520). Each cell in the reshuffled feature map 525a includes the data from the input feature map 520 according to the organization of the indexing matrix 525. The kernel 510a here represents a single-row version of the original kernel 510. Note that while the kernel 510a here is formed by concatenating the rows of the original kernel 510, other arrangements of the original kernel 510 could be used.

Due to the size of the reshuffled feature map 525a, the actual reshuffled feature map 525a need not be stored in memory and can instead be formed as individual panel matrices. Here, the convolution streaming engine 414 converts portions of the indexing matrix 525 into corresponding portions of the reshuffled feature map 525a as needed by the panel matrix engine 420. For example, a single column of the indexing matrix 525 can be converted into a corresponding single column of the reshuffled feature map 525a by replacing the index values in one column of the indexing matrix 525 with the corresponding data values from the input feature map 520. The convolution streaming engine 414 converts portions of the indexing matrix 525 into portions of the reshuffled feature map 525a and supplies the converted portions to the panel matrix engine 420 on the fly. For instance, the panel matrix engine 420 can multiply the kernel 510a by a supplied portion of the reshuffled feature map 525a to generate a multiplication result. The supplied portion of the reshuffled feature map 525a is referred to as a single "panel matrix." The convolution streaming engine 414 can supply the portions of the reshuffled feature map 525a until all contents of the reshuffled feature map 525a have been provided to the panel matrix engine 420. In some embodiments, each panel matrix represents a single column of the reshuffled feature map 525a, although other implementations are also possible, such as when each panel matrix includes multiple columns from the reshuffled feature map 525a.

In other embodiments (such as when there is suitable memory), the convolution streaming engine 414 converts the entirety of the indexing matrix 525 into the reshuffled feature map 525a and stores the entire reshuffled feature map 525a in a memory, such as the DRAM 412, the SRAM 418, or both. The convolution streaming engine 414 can then transmit individual panels (portions) of the reshuffled feature map 525a to the panel matrix engine 420.

A convolution of the kernel 510a and each panel of the reshuffled feature map 525a generates the output 530. For example, the panel matrix engine 420 can receive the first column of the reshuffled feature map 525a ('X_0,' 'X_1,' 'X_4,' and 'X_5') from the convolution streaming engine 414. The panel matrix engine 420 multiplies the kernel 510a and the first column of the reshuffled feature map 525a to generate the first output 530 denoted 'Y_0.' The panel matrix engine 420 can receive the second column of the reshuffled feature map 525a ('X_1,' 'X_2,' 'X_5,' and 'X_6') from the convolution streaming engine 414. The panel matrix engine 420 multiplies the kernel 510a and the second column of the reshuffled feature map 525a to generate the next output 530 denoted 'Y_1.' The same general process can be repeated until all outputs 530 have been generated. The outputs 530 can then, if desired, be provided to a pooling layer, normalization layer, or other layer for further processing.

Although FIGS. 5A-5K represent an example process of convolution streaming for a neural network, various changes may be made to FIGS. 5A-5K. For example, the kernel, input feature map, indexing matrix, and reshuffled feature map shown here are examples only.

Figure 6A:
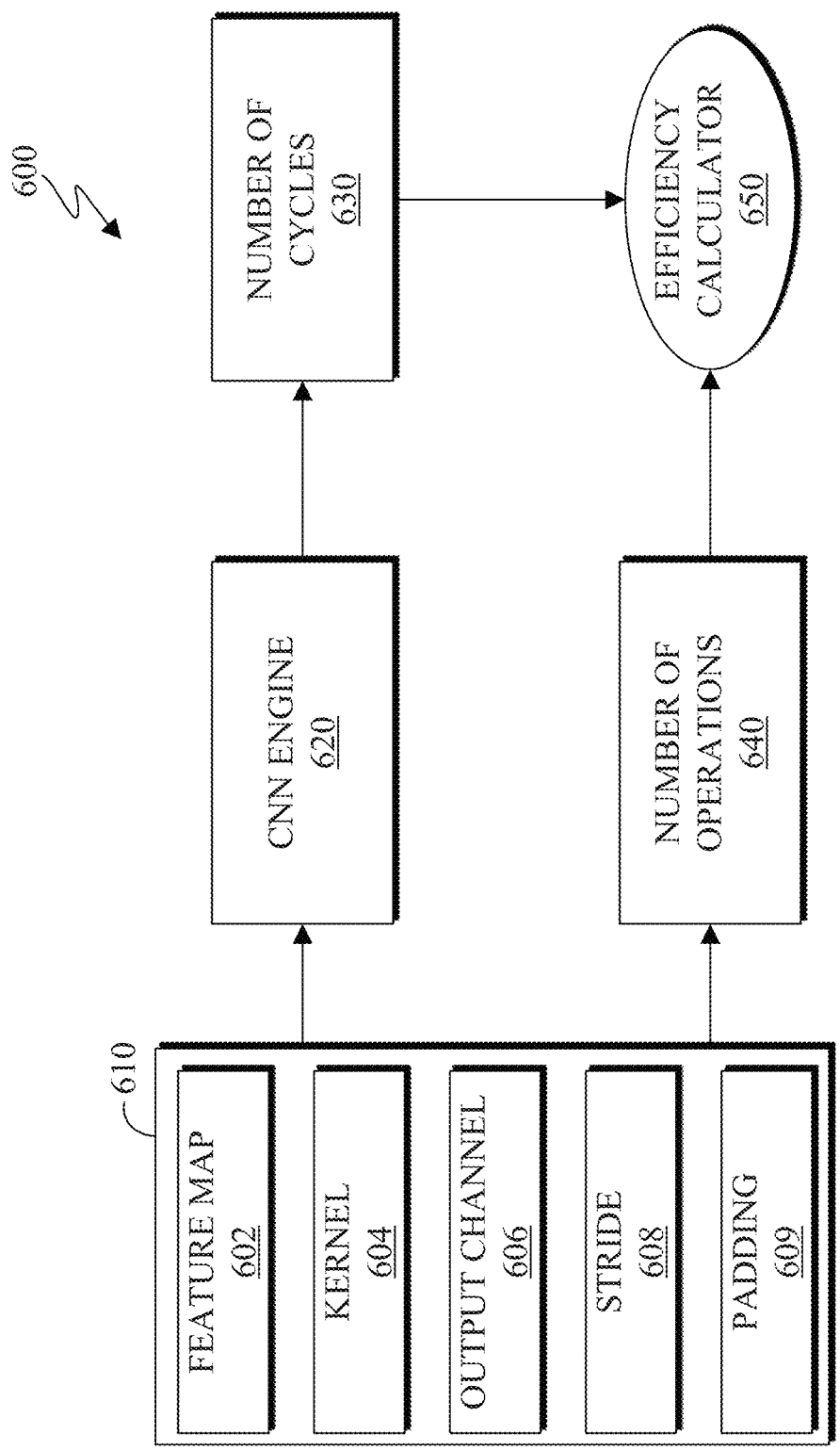
FIG. 6A illustrates an example process for computing efficiency in accordance with an embodiment of this disclosure.
Figure 6B:
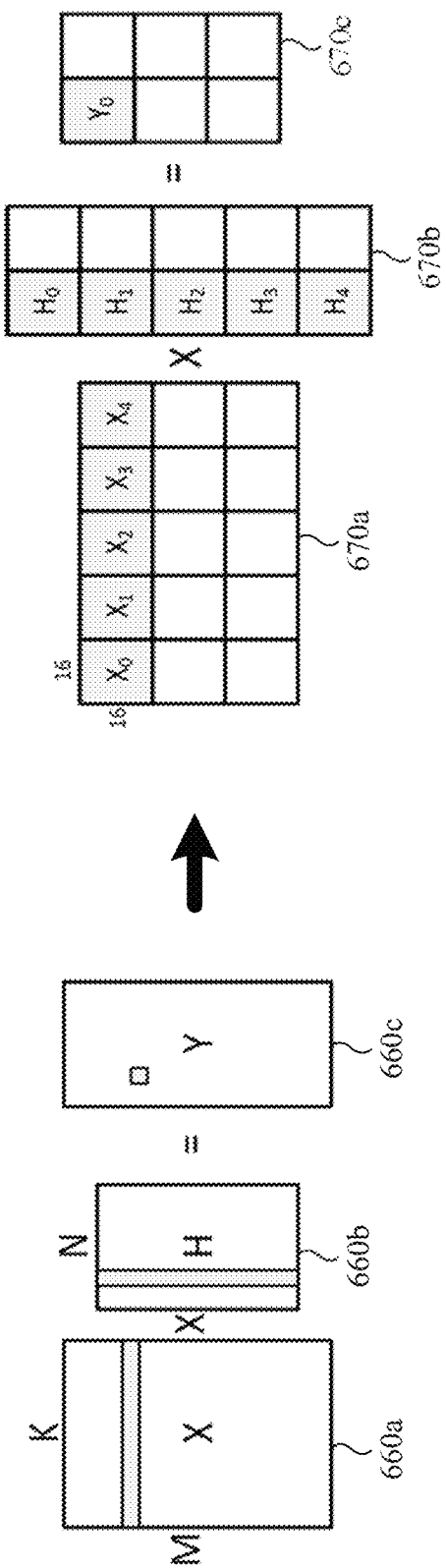
FIG. 6B illustrates an example panel matrix operation in accordance with an embodiment of this disclosure.

FIG. 6A illustrates an example process 600 for computing efficiency in accordance with an embodiment of this disclosure. FIG. 6B illustrates an example panel matrix operation in accordance with an embodiment of this disclosure. In some embodiments, the process 600 for computing efficiency can be performed by the electronic device 450 400, and the panel matrix operation, of FIG. 6B, can be performed by the panel matrix engine 420.

As shown in FIG. 6A, convolution configurations 610 include a feature map 602 (which may be the same as or similar to the input feature map 520 of FIG. 5A), a size of a kernel 604 (which may be the same as or similar to the kernel 510 of FIG. 5A), an output channel 606, a stride 608, and a padding 609. In some embodiments, the convolution configurations 610 may be the same as or similar to the convolution configuration 405 of FIG. 4A. The size of the feature map 602 is represented by Equation (1) above and the size of the kernel 604 is represented by Equation (2) above. The output channel 606 is represented by the variable D. The stride 608 is represented by the variable S. The padding 609 is represented by the variable P.

A CNN engine 620 performs the convolution of the neural network. A number of cycles 630 is a counter that calculates the number of cycles for the CNN engine 620 to finish the computation. In some embodiments, the number of cycles 630 is a timer that calculates the duration of time it takes for the CNN engine 620 to finish the computation. A number of operations 640 estimates the theoretical number of multiply and accumulates (MAC) operations. For example, given Equations (4) and (5) below, the theoretical MAC can be represented as Equation (6).

$$S = 1 \quad (4)$$

$$P = \frac{(K-1)}{2} \quad (5)$$

$$\text{Theoretical } Mac = H * W * C * D * K * K \quad (6)$$

Equation (6) illustrates that the theoretical MAC is the product of (i) the feature map size 602 as expressed in Equation (1), (ii) the output channel 606, and (iii) the kernel size as expressed in Equation (2), when the stride is equal to one as expressed in Equation (4), and the padding is equal to half of the difference of a kernel dimension minus one as expressed in Equation (5).

An efficiency calculator 650 derives the efficiency of the convolution (such as the convolution operation of FIGS. 5A-5K). The compute efficiency can be represented in Equation (7) below.

$$\text{Compute Efficiency} = \frac{\text{Measured Cycles}}{MAC} \quad (7)$$

Equation (7) illustrates that the compute efficiency of a neural network using the convolution streaming engine 414 and the panel matrix engine 420 is based on the output of the number of cycles 630 per the output of the number of operations 640.

FIG. 6B illustrates example panel matrix operation to determine compute efficiency. As noted above, the size of a panel matrix can be derived based on the compute capacity of the hardware of the neural network. Here, an input feature map 660a and a kernel 660b can generate an output 660c through convolution computations. The example convolution of the input feature map 660a, the kernel 660b, and the output 660c can include data such as data 'X' of the input feature map 660a, data 'H' of the kernel 660b, and data 'Y' of the output 660c. A single row of the input feature map 660a and a single column of the kernel 660b can be used to generate a single cell in the output 660c. The convolution operation of the input feature map 660a and the kernel 660b can be expressed as a matrix multiplication of matrix 670a and matrix 670b as performed by the convolution streaming engine 414 and the panel matrix engine 420. Multiplying a row of matrix 670a and a row of matrix 670b generates a single value in the output matrix 670c. It should be noted that the single value in the output matrix 670c corresponds to the single cell in the output 660c. Equation (8) below illustrates an example efficiency calculation for identifying a panel matrix size.

$$\text{Efficiency} = \frac{\frac{M}{P}\frac{K}{P}\frac{N}{P}}{\left\lceil\frac{M}{P}\right\rceil\left\lceil\frac{K}{P}\right\rceil\left\lceil\frac{N}{P}\right\rceil} \quad (8)$$

Equation (8) illustrates that if M=K=N=1000 and P=16, the efficiency of a convolution operation using matrix multiplication via the convolution streaming engine 414 and the panel matrix engine 420 is 97.64%. As a result, when M, K, and N are greater than P, the efficiency is close to one as indicated in Equation (8).

Although FIG. 6A illustrates one example of a process for computing efficiency and FIG. 6B illustrates one example of a panel matrix operation, various changes may be made to FIGS. 6A and 6B. For example, other techniques for computing efficiency can be used.

Figure 7:
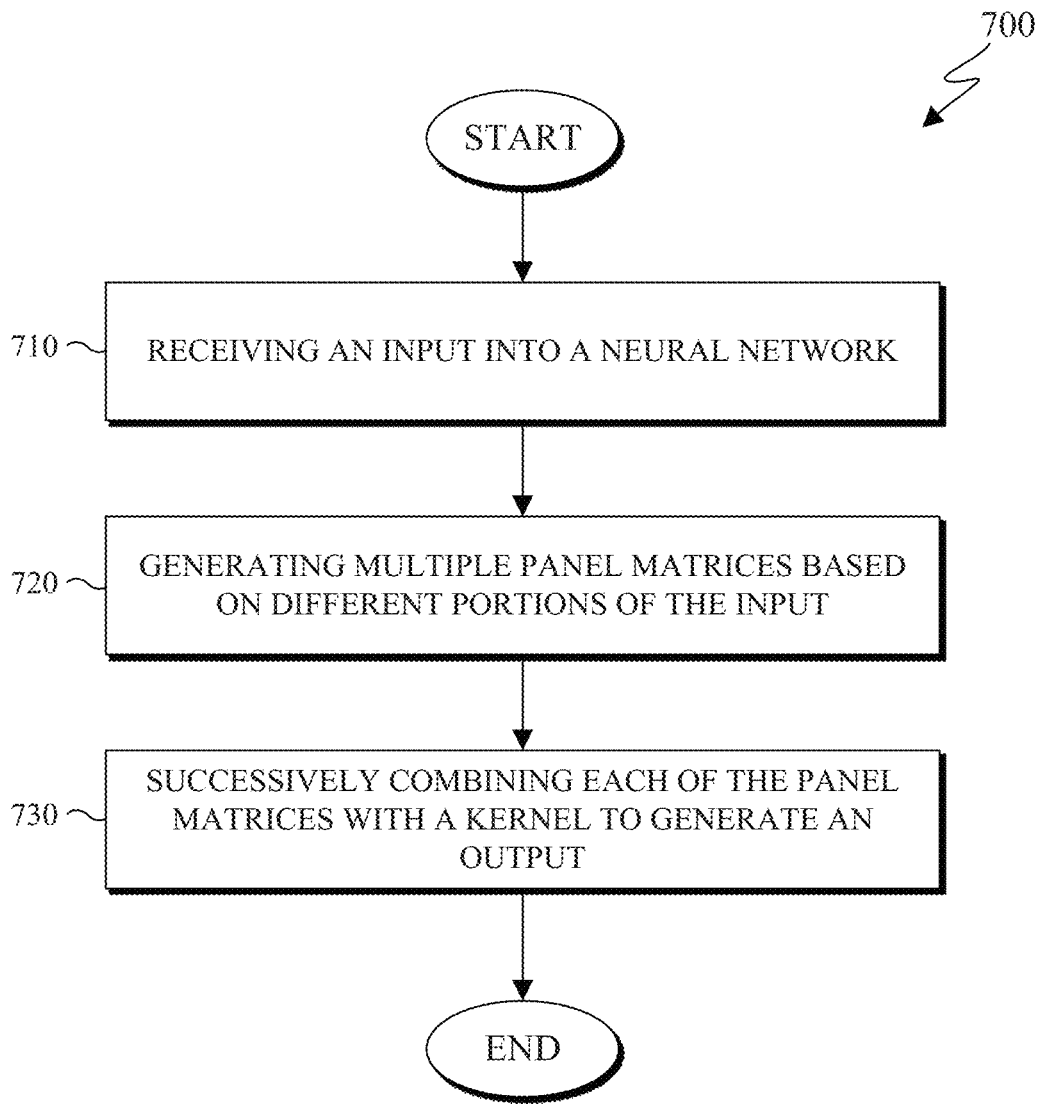
FIG. 7 illustrates an example method for a convolutional neural network process in accordance with embodiments of this disclosure.

FIG. 7 illustrates an example method 700 for a convolutional neural network process in accordance with embodiments of this disclosure. The method 700 could be performed by any of the devices 102-114 of FIG. 1, the server 200 of FIG. 2, the electronic device 300 of FIG. 3, the electronic device 450 of FIG. 4B, or any other suitable device or system. For ease of explanation, the method 700 is described as being performed by the electronic device 450 of FIG. 4B.

In step 710, an electronic device receives an input into a neural network. The received input can be an input feature map, such as the input feature map 410. The neural network can include various configurations of convolution layers and connected layers. Additionally, the neural network can include a kernel. For example, different kernels can be used in different convolution layers In step 720, a convolution streaming engine generates multiple panel matrices based on different portions of the input. For example, the convolution streaming engine 414 can generate a panel matrix from an indexing matrix based at least in part on the size of a specified kernel, such as in the manner shown in FIGS. 5A-5K. During this process, a window can be shifted so that all values in the input are mapped into the indexing matrix. As noted above, for instance, the shifting can occur left to right and top to bottom, although other mappings are also possible. Depending on the implementation, the convolution streaming engine 414 can generate the indexing matrix prior to a convolution operation or during a convolution operation. The indexing matrix can be a function of sizes of the input, kernel, padding, stride, or a combination thereof. As noted above, the input can be reshuffled based on the indexing matrix, such that a reshuffled feature map is generated. The reshuffled feature map can then be partitioned into the multiple panel matrices. In some embodiments, each panel matrix represents a portion of the reshuffled feature map, such as a single column or multiple columns of the reshuffled feature map.

In step 730, a panel matrix engine successively combines each of the multiple panel matrices with the kernel to generate an output. For example, the convolution streaming engine 414 can provide each panel matrix to the panel matrix engine 420, and the panel matrix engine 420 multiples each received panel matrix with the kernel. In some embodiments, the output is an output matrix, where each output value in the matrix represents the result of multiplying one panel matrix and the kernel.

Although FIG. 7 illustrates one example of a method 700 for a convolutional neural network process, various changes may be made to FIG. 7. For example, while shown as a series of steps, various steps in FIG. 7 could overlap, occur in parallel, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method comprising:
providing an input corresponding to an image into a neural network for analysis of the image, the neural network including a kernel;
generating, during a convolution operation of the neural network, an indexing matrix that includes multiple panel matrices by mapping elements within a window of a feature map representing the input onto a portion of the indexing matrix, wherein the multiple panel matrices are based on different portions of the feature map; and
successively combining each of the multiple panel matrices with the kernel to generate an output of the convolution operation.

2. The method of claim 1, wherein generating the indexing matrix comprises:
mapping initial elements within the window of the feature map onto a column of the indexing matrix, wherein a size of the window corresponds to a size of the kernel;
shifting the window such that a portion of the window includes at least one element included in a previous mapping and at least one new element not included in any previous mapping;
after the window is shifted, mapping current elements within the window onto a sequential neighboring column of the indexing matrix;
reshuffling the feature map based on the indexing matrix; and
partitioning the reshuffled feature map into the multiple panel matrices; and
wherein shifting of the window and mapping of the current elements within the window onto the sequential neighboring column continues until each element of the feature map is mapped.

3. The method of claim 2, wherein shifting the window comprises:
shifting the window across the feature map in a horizontal direction from a first location;
after the window reaches an edge of the feature map, returning the window to the first location and shifting the window in a vertical direction; and
after the window is shifted in the vertical direction, shifting the window across the feature map in the horizontal direction; and
wherein the window continues to shift horizontally and vertically until each element of the feature map is mapped onto the indexing matrix.

4. The method of claim 2, wherein:
mapping the initial elements or the current elements within the window comprises mapping each element within the window from left to right and top to bottom onto one column of the indexing matrix; and
shifting the window comprises shifting the window from a first location left to right and top to bottom.

5. The method of claim 2, wherein the indexing matrix is a function of the size of the kernel, a size of the feature map, a padding, and a stride.

6. The method of claim 1, wherein the multiple panel matrices are sized based on a size of the kernel and a compute capacity of the neural network.

7. The method of claim 1, wherein:
the output comprises an output matrix; and
successively combining each of the multiple panel matrices with the kernel to generate the output comprises:
combining a first panel matrix of the multiple panel matrices with the kernel to generate a first value;
storing the first value in a first cell of the output matrix;
combining each sequential one of the multiple panel matrices with the kernel to generate sequential values; and
storing each of the sequential values in a neighboring cell of the output matrix.

8. An electronic device comprising:
at least one processor configured to:
provide an input corresponding to an image into a neural network for analysis of the image, the neural network including a kernel;
generate, during a convolution operation of the neural network, an indexing matrix that includes, multiple panel matrices, wherein, to generate the indexing matrix, the at least one processor is configured to map elements within a window of a feature map representing the input onto a portion of the indexing matrix, and wherein the multiple panel matrices are based on different portions of the feature map; and
successively combine each of the multiple panel matrices with the kernel to generate an output of the convolution operation.

9. The electronic device of claim 8, wherein, to generate the indexing matrix, the at least one processor is configured to:
map initial elements within the window of the feature map onto a column of the indexing matrix, wherein a size of the window corresponds to a size of the kernel;
shift the window such that a portion of the window includes at least one element included in a previous mapping and at least one new element not included in any previous mapping;
after the window is shifted, map current elements within the window onto a sequential neighboring column of the indexing matrix;
reshuffle the feature map based on the indexing matrix;
partition the reshuffled feature map into the multiple panel matrices; and
continue to shift the window and map the current elements within the window onto the sequential neighboring column until each element of the feature map is mapped.

10. The electronic device of claim 9, wherein, to shift the window, the at least one processor is configured to:
shift the window across the feature map in a horizontal direction from a first location;
after the window reaches an edge of the feature map, return the window to the first location and shift the window in a vertical direction;
after the window is shifted in the vertical direction, shift the window across the feature map in the horizontal direction; and
continue to shift the window horizontally and vertically until each element of the feature map is mapped onto the indexing matrix.

11. The electronic device of claim 9, wherein:
to map the initial elements or the current elements within the window, the at least one processor is configured to map each element within the window from left to right and top to bottom onto one column of the indexing matrix; and
to shift the window, the at least one processor is configured to shift the window from a first location left to right and top to bottom.

12. The electronic device of claim 9, wherein the indexing matrix is a function of the size of the kernel, a size of the feature map, a padding, and a stride.

13. The electronic device of claim 8, wherein the multiple panel matrices are sized based on a size of the kernel and a compute capacity of the neural network.

14. The electronic device of claim 8, wherein:
the output comprises an output matrix; and
to successively combine each of the multiple panel matrices with the kernel to generate the output, the at least one processor is configured to:
combine a first panel matrix of the multiple panel matrices with the kernel to generate a first value;
store the first value in a first cell of the output matrix;
combine each sequential one of the multiple panel matrices with the kernel to generate sequential values; and
store each of the sequential values in a neighboring cell of the output matrix.

15. A non-transitory computer readable medium containing computer readable program code that, when executed by at least one processor of an electronic device, causes the at least one processor to:
provide an input corresponding to an image into a neural network for analysis of the image, the neural network including a kernel;
generate, during a convolution operation of the neural network, an indexing matrix that includes multiple panel matrices, wherein the computer readable program code that when executed causes the at least one processor to generate the indexing matrix comprises computer readable program code that when executed causes the at least one processor to map elements within a window of a feature map representing the input onto a portion of the indexing matrix, and wherein the multiple panel matrices are based on different portions of the feature map; and
successively combine each of the multiple panel matrices with the kernel to generate an output of the convolution operation.

16. The non-transitory computer readable medium of claim 15, wherein the computer readable program code that when executed causes the at least one processor to generate the indexing matrix comprises computer readable program code that when executed causes the at least one processor to:
map initial elements within the window of the feature map onto a column of the indexing matrix, wherein a size of the window corresponds to a size of the kernel;
shift the window such that a portion of the window includes at least one element included in a previous mapping and at least one new element not included in any previous mapping;
after the window is shifted, map current elements within the window onto a sequential neighboring column of the indexing matrix;
reshuffle the feature map based on the indexing matrix;
partition the reshuffled feature map into the multiple panel matrices; and continue to shift the window and map the current elements within the window onto the sequential neighboring column until each element of the feature map is mapped.

17. The non-transitory computer readable medium of claim 16, wherein the computer readable program code that when executed causes the at least one processor to shift the window comprises computer readable program code that when executed causes the at least one processor to:
shift the window across the feature map in a horizontal direction from a first location;
after the window reaches an edge of the feature map, return the window to the first location and shift the window in a vertical direction;
after the window is shifted in the vertical direction, shift the window across the feature map in the horizontal direction; and
continue to shift the window horizontally and vertically until each element of the feature map is mapped onto the indexing matrix.

18. The non-transitory computer readable medium of claim 16, wherein:
the computer readable program code that when executed causes the at least one processor to map the initial elements or the current elements within the window comprises computer readable program code that when executed causes the at least one processor to map each element within the window from left to right and top to bottom onto one column of the indexing matrix; and
the computer readable program code that when executed causes the at least one processor to shift the window comprises computer readable program code that when executed causes the at least one processor to shift the window from a first location left to right and top to bottom.

19. The non-transitory computer readable medium of claim 15, wherein the multiple panel matrices are sized based on a size of the kernel and a compute capacity of the neural network.

20. The non-transitory computer readable medium of claim 15, wherein:
the output comprises an output matrix; and
the computer readable program code that when executed causes the at least one processor to successively combine each of the multiple panel matrices with the kernel to generate the output comprises computer readable program code that when executed causes the at least one processor to:
combine a first panel matrix of the multiple panel matrices with the kernel to generate a first value;
store the first value in a first cell of the output matrix;
combine each sequential one of the multiple panel matrices with the kernel to generate sequential values; and
store each of the sequential values in a neighboring cell of the output matrix.

* * * * *